US007427847B2

(12) United States Patent
Yoshihisa

(10) Patent No.: US 7,427,847 B2
(45) Date of Patent: Sep. 23, 2008

(54) STEPPING MOTOR CONTROLLER, PRINTER, STEPPING MOTOR CONTROL METHOD AND STEPPING MOTOR CONTROL PROGRAM PRODUCT

(75) Inventor: Yasuhiko Yoshihisa, Nagano (JP)

(73) Assignee: Seiko Epson Corporation, Tokyo (JP)

(*) Notice: Subject to any disclaimer, the term of this patent is extended or adjusted under 35 U.S.C. 154(b) by 15 days.

(21) Appl. No.: 11/452,452

(22) Filed: Jun. 13, 2006

(65) Prior Publication Data

US 2007/0001642 A1 Jan. 4, 2007

(30) Foreign Application Priority Data

Jun. 13, 2005 (JP) ............................ 2005-171960

(51) Int. Cl.
*H02P 8/04* (2006.01)

(52) U.S. Cl. ...................................... 318/685; 318/696

(58) Field of Classification Search ................. 318/138, 318/254, 436, 439, 685, 696, 700, 701, 720–724
See application file for complete search history.

(56) References Cited

U.S. PATENT DOCUMENTS

| | | | | |
|---|---|---|---|---|
| 4,481,454 | A * | 11/1984 | Otani | 318/696 |
| 5,235,264 | A * | 8/1993 | Kaneda et al. | 318/727 |
| 5,291,111 | A * | 3/1994 | Hirano | 318/563 |
| 6,222,340 | B1 * | 4/2001 | Kawabata et al. | 318/685 |
| 6,459,229 | B1 * | 10/2002 | Kawanabe | 318/696 |
| 6,963,415 | B1 * | 11/2005 | Saito | 358/1.14 |
| 7,026,781 | B2 * | 4/2006 | Yamazaki et al. | 318/685 |

FOREIGN PATENT DOCUMENTS

| | | |
|---|---|---|
| JP | 2002-281788 | 9/2002 |

* cited by examiner

*Primary Examiner*—Bentsu Ro
(74) *Attorney, Agent, or Firm*—Edwards Angell Palmer & Dodge LLP; John J. Penny, Jr.

(57) ABSTRACT

A stepping motor control method including: supplying hold current for holding a rotor of a stepping motor at a prescribed angle to the stepping motor as required while the stepping motor stops; performing a phase change at a frequency lower than a maximum self-start frequency when the stepping motor is rotated, under a state that the hold current is not supplied to the stepping motor, from a stopping state; and then, performing an accelerating process.

10 Claims, 8 Drawing Sheets

FIG. 4

| No. | PHASE A | | | | | | | PHASE B | | | | | | | OUTPUT MODE | | | |
|---|---|---|---|---|---|---|---|---|---|---|---|---|---|---|---|---|---|---|
| | IA4 | IA3 | IA2 | IA1 | ENA1 | PHA1 | Iout | IB4 | IB3 | IB2 | IB1 | ENA1 | PHA2 | Iout | Output A | Output $\overline{A}$ | Output B | Output $\overline{B}$ |
| 0 | 1 | 1 | 1 | 1 | 0 | 0 | 100% | 0 | 0 | 1 | 0 | 1 | 0 | 0% | L | H | L | H |
| 1 | 1 | 1 | 1 | 1 | 0 | 0 | 100 | 0 | 0 | 1 | 0 | 0 | 0 | 17.39 | L | H | L | H |
| 2 | 1 | 1 | 1 | 1 | 0 | 0 | 100 | 0 | 0 | 1 | 1 | 0 | 0 | 26.08 | L | H | L | H |
| 3 | 1 | 1 | 1 | 0 | 0 | 0 | 95.65 | 0 | 1 | 0 | 0 | 0 | 0 | 34.78 | L | H | L | H |
| 4 | 1 | 1 | 0 | 1 | 0 | 0 | 91.30 | 0 | 1 | 0 | 1 | 0 | 0 | 43.48 | L | H | L | H |
| 5 | 1 | 1 | 0 | 0 | 0 | 0 | 86.95 | 0 | 1 | 1 | 0 | 0 | 0 | 52.17 | L | H | L | H |
| 6 | 1 | 0 | 1 | 1 | 0 | 0 | 82.61 | 0 | 1 | 1 | 1 | 0 | 0 | 60.87 | L | H | L | H |
| 7 | 1 | 0 | 1 | 0 | 0 | 0 | 78.26 | 1 | 0 | 0 | 0 | 0 | 0 | 69.56 | L | H | L | H |
| 8 | 1 | 0 | 0 | 1 | 0 | 0 | 73.91 | 1 | 0 | 0 | 1 | 0 | 0 | 73.91 | L | H | L | H |
| 9 | 1 | 0 | 0 | 0 | 0 | 0 | 69.56 | 1 | 0 | 1 | 0 | 0 | 0 | 78.26 | L | H | L | H |
| 10 | 0 | 1 | 1 | 1 | 0 | 0 | 60.87 | 1 | 0 | 1 | 1 | 0 | 0 | 82.61 | L | H | L | H |
| 11 | 0 | 1 | 1 | 0 | 0 | 0 | 52.17 | 1 | 1 | 0 | 0 | 0 | 0 | 86.95 | L | H | L | H |
| 12 | 0 | 1 | 0 | 1 | 0 | 0 | 43.48 | 1 | 1 | 0 | 1 | 0 | 0 | 91.30 | L | H | L | H |
| 13 | 0 | 1 | 0 | 0 | 0 | 0 | 34.78 | 1 | 1 | 1 | 0 | 0 | 0 | 95.65 | L | H | L | H |
| 14 | 0 | 0 | 1 | 1 | 0 | 0 | 26.08 | 1 | 1 | 1 | 1 | 0 | 0 | 100 | L | H | L | H |
| 15 | 0 | 0 | 1 | 0 | 0 | 0 | 17.39 | 1 | 1 | 1 | 1 | 0 | 0 | 100 | L | H | L | H |
| 16 | 0 | 0 | 0 | 1 | 1 | * | 0 | 1 | 1 | 1 | 1 | 0 | 0 | 100 | H | L | L | H |
| 17 | 0 | 0 | 1 | 0 | 0 | 1 | 17.39 | 1 | 1 | 1 | 1 | 0 | 0 | 100 | H | L | L | H |
| 18 | 0 | 0 | 1 | 1 | 0 | 1 | 26.08 | 1 | 1 | 1 | 1 | 0 | 0 | 100 | H | L | L | H |
| 19 | 0 | 1 | 0 | 0 | 0 | 1 | 34.78 | 1 | 1 | 1 | 0 | 0 | 0 | 95.65 | H | L | L | H |
| 20 | 0 | 1 | 0 | 1 | 0 | 1 | 43.48 | 1 | 1 | 0 | 1 | 0 | 0 | 91.30 | H | L | L | H |
| 21 | 0 | 1 | 1 | 0 | 0 | 1 | 52.17 | 1 | 1 | 0 | 0 | 0 | 0 | 86.95 | H | L | L | H |
| 22 | 0 | 1 | 1 | 1 | 0 | 1 | 60.87 | 1 | 0 | 1 | 1 | 0 | 0 | 82.61 | H | L | L | H |
| 23 | 1 | 0 | 0 | 0 | 0 | 1 | 69.56 | 1 | 0 | 1 | 0 | 0 | 0 | 78.26 | H | L | L | H |
| 24 | 1 | 0 | 0 | 1 | 0 | 1 | 73.91 | 1 | 0 | 0 | 1 | 0 | 0 | 73.91 | H | L | L | H |
| 25 | 1 | 0 | 1 | 0 | 0 | 1 | 78.26 | 1 | 0 | 0 | 0 | 0 | 0 | 69.56 | H | L | L | H |
| 26 | 1 | 0 | 1 | 1 | 0 | 1 | 82.61 | 0 | 1 | 1 | 1 | 0 | 0 | 60.87 | H | L | L | H |
| 27 | 1 | 1 | 0 | 0 | 0 | 1 | 86.95 | 0 | 1 | 1 | 0 | 0 | 0 | 52.17 | H | L | L | H |
| 28 | 1 | 1 | 0 | 1 | 0 | 1 | 91.30 | 0 | 1 | 0 | 1 | 0 | 0 | 43.48 | H | L | L | H |
| 29 | 1 | 1 | 1 | 0 | 0 | 1 | 95.65 | 0 | 1 | 0 | 0 | 0 | 0 | 34.78 | H | L | L | H |
| 30 | 1 | 1 | 1 | 1 | 0 | 1 | 100 | 0 | 0 | 1 | 1 | 0 | 0 | 26.08 | H | L | L | H |
| 31 | 1 | 1 | 1 | 1 | 0 | 1 | 100 | 0 | 0 | 1 | 0 | 0 | 0 | 17.39 | H | L | L | H |

STEPPING MOTOR CONTROLLER, PRINTER, STEPPING MOTOR CONTROL METHOD AND STEPPING MOTOR CONTROL PROGRAM PRODUCT

BACKGROUND OF THE INVENTION

1. Technical Field of the Invention

The present invention relates to a stepping motor, a printer, a stepping motor control method and a stepping motor control program product.

2. Description of the Related Art

A usual stepping motor driving device ordinarily employs a method in which a table showing a relation between an angle of a rotor of a stepping motor and a phase of excitation is referred to supply an exciting current corresponding to the angle of the rotor and rotate the rotator to a desired angle (see JP-A-2002-281788 (Abstract, Claims).

In the usual driving device, when the relation between the angle of the rotor and the phase of excitation deviates, an accelerating operation becomes unstable at the start of rotation, so that the angle of the rotor deviates from the phase of excitation, what is called, a step-out may be undesirably caused.

Thus, in order to prevent the angle of the rotor from deviating the phase of excitation, a technique is proposed that when the stepping motor stops, a hold current is supplied. However, in such a method, a problem arises that the motor may generate heat by the hold current. Further, since the hold current needs to be constantly supplied, a consumed electric power is undesirably increased.

SUMMARY OF THE INVENTION

The present invention is devised by considering the above-described circumstances, and it is an object of the present invention to provide a stepping motor controller, a printer, a stepping motor control method and a stepping motor control program product in which a stepping motor is assuredly activated and a heat is hardly generated and an electric power is little consumed.

In order to achieve the above-described object, there is provided a stepping motor control method including: supplying hold current for holding a rotor of a stepping motor at a prescribed angle to the stepping motor as required while the stepping motor stops; performing a phase change at a frequency lower than a maximum self-start frequency when the stepping motor is rotated, under a state that the hold current is not supplied to the stepping motor, from a stopping state; and then, performing an accelerating process.

Accordingly, the stepping motor control method can be provided in which the stepping motor is assuredly activated and a heat is hardly generated and an electric power is little consumed.

In a stepping motor control method according to another invention in addition to the above-described invention, when the stepping motor maintains the stopping state for a prescribed time or more, the hold current is not supplied to the stepping motor. Accordingly, when the stepping motor remains in the stopping state for a prescribed time or more, the hold current is not supplied to the stepping motor, so that a consumed electric power and a heat generation can be suppressed.

Further, in a stepping motor control method according to other invention in addition to the above-described invention, the hold current is not supplied to the stepping motor while the stepping motor is stopped under an electric power saving mode. Accordingly, the electric power saving mode can be set depending on a purpose of use of a user.

Further, in a stepping motor control method according to other invention in addition to the above-described invention, while the stepping motor stops and the rotor does not need to be held at a prescribed angle, the hold current is not supplied to the stepping motor. Accordingly, the hold current is not supplied in accordance with the operating state of the stepping motor, the consumed electric power and the heat generation can be suppressed.

Further, in a stepping motor control method according to other invention in addition to each of the above-described inventions, the phase change is performed at least once at the frequency lower than a maximum self-start frequency when the stepping motor is rotated from a stopping state Accordingly, the stepping motor can be assuredly activated, regardless of whether the deviation between the angle of the rotor and a phase of excitation is large or small.

Further, in a stepping motor control method according to other invention in addition to each of the above-described inventions, the number of times of the phase change is set depending on a situation. Accordingly, for instance, even when the state of the stepping motor changes due to the aged deterioration of the stepping motor, the stepping motor can be assuredly activated.

Further, in a stepping motor control method according to other invention in addition to the above-described invention, the frequency of the phase change is set in accordance with the maximum self-start frequency which changes depending on a load. Accordingly, even when the load varies, the stepping motor can be assuredly activated.

Further, a stepping motor controller according to the present invention, comprising: a control circuit, controlling an exciting sequence of a stepping motor; a switching circuit, switching electric power supplied to the stepping motor in accordance with a command from the control circuit; and a hold current supply circuit, supplying hold current for holding a rotor of the stepping motor at a prescribed angle to the stepping motor as required while the stepping motor stops, wherein when the stepping motor is rotated, under a state that the hold current is not supplied to the stepping motor by the hold current supply circuit, from a stopping state, the control circuit performs a phase change at a frequency lower than a maximum self-start frequency, and then, performs an accelerating process.

Accordingly, the stepping motor controller can be provided in which the stepping motor is assuredly activated and a heat is hardly generated and an electric power is little consumed.

Further, a printer according to the present invention has the above-described stepping motor controller. Accordingly, the printer can be provided in which a stepping motor forming the printer is assuredly activated and a heat is hardly generated and an electric power is little consumed.

Further, according to other invention a stepping motor control method for a stepping motor controller including: a control circuit, controlling an exciting sequence of a stepping motor; a switching circuit, switching electric power supplied to the stepping motor in accordance with a command from the control circuit; and a hold current supply circuit, supplying hold current for holding a rotor of the stepping motor at a prescribed angle to the stepping motor as required while the stepping motor stops, the method comprising: performing a phase change at a frequency lower than a maximum self-start frequency when the stepping motor is rotated, under a state in which the hold current is not supplied to the stepping motor by the hold current supply circuit, from a stopping state; and then performing an accelerating process.

Further, a stepping motor control program product according to the present invention, the program product being readable by a computer and including a set of instructions for controlling a stepping motor controller, the set of instructions comprising: supplying hold current for holding a rotor of the stepping motor at a prescribed angle to the stepping motor as required while the stepping motor stops; performing a phase change at a frequency lower than a maximum self-start frequency when the stepping motor is rotated, under a state that the hold current is not supplied to the stepping motor, from a stopping state; and then, performing an accelerating process.

Accordingly, the stepping motor control program product can be provided in which the stepping motor is assuredly activated and a heat is hardly generated and an electric power is little consumed.

BRIEF DESCRIPTION OF THE DRAWINGS

FIG. 4 is a diagram showing one example of a table of a driving circuit shown in FIG. 3;

DETAILED DESCRIPTION OF THE INVENTION

Figure 1:
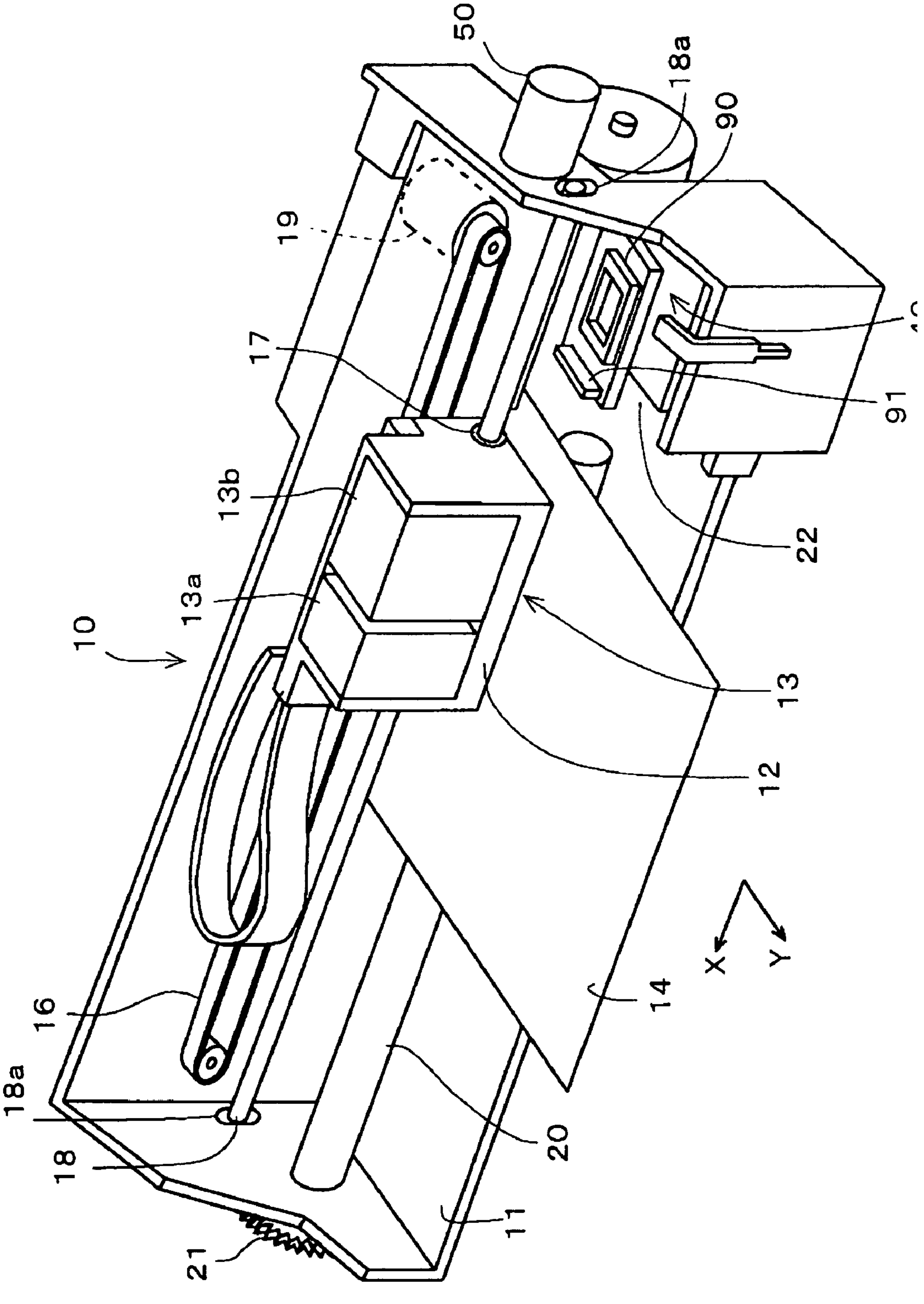
FIG. 1 is a diagram showing a structural example of a printer according to an embodiment of the present invention.

Now, an embodiment of the present invention will be described below by referring to the drawings.

FIGS. 1 to 8 show diagrams for explaining a printer using a stepping motor controller according to an embodiment of the present invention. Now, the embodiment of the present invention will be described with reference to FIGS. 1 to 8. FIG. 1 is a perspective view showing a basic structure of a printer 10 according to the embodiment. As shown in FIG. 1, the printer 10 has a base body 11 and a carriage 12 freely reciprocates in a main scanning direction (a direction X shown in the drawing) relative to the base body 11.

The carriage 12 forms an ink jet type recording head member 13 in which a cartridge 13*a* for black ink and a cartridge 13*b* for yellow, cyan and magenta can be mounted. In the lower part of the carriage 12, a recording head 15 is provided so as to be opposed to a recording sheet 14. The recording head 15 has a nozzle forming surface 15*a* on its lower end face so as to discharge ink.

To the carriage 12, a part of a timing belt 16 is fixed. Further, on the carriage 12, an insert hole 17 is formed and a lengthy guide shaft 18 can be inserted into the insert hole 17. Accordingly, when a carriage motor 19 is rotated, the timing belt 16 is driven and the carriage 12 moves in the main scanning direction along the guide shaft 18 in accordance with the driving of the timing belt 16.

The guide shaft 18 is inserted into slits 18*a* respectively provided on the right and left side surface parts of the base body 11. The slit 18*a* has a form elongated in the direction vertical to the bottom surface of the base body 11 so that the guide shaft 18 inserted into the slits 18*a* can slide along the slits 18*a*. A gap adjusting motor 50 is provided on the side surface part of the base body 11 to drive the guide shaft 18 upward and downward by a driving mechanism that is not shown in the drawing. As a result, a distance between the nozzle forming surface 15*a* and the recording sheet 14 can be set as required. For instance, when the thickness of the recording sheet 14 is large, the distance is set to be long.

Further, in the lower side of the inner part of the base body 11, a roller member 20 is provided so as to freely rotate. The roller member 20 is provided so as to be driven and rotated by a row of a gear ring 21 provided on the other end side of the base body 11. Then, the recording sheet 14 supplied to the printer 10 is moved in the sub-scanning direction (a direction Y shown in the drawing) of the recording head 15 by the rotation of the roller member 20. To rotate and drive the roller member 20, a sheet feed motor not shown in the drawing is provided in the other end side of the inner part of the base body 11.

Here, the roller member 20 is provided only in an area (a printing area) where a printing operation can be carried out in the inner part of the base body 11 as much as possible. A non-printing area where the roller member 20 is not provided in the inner part of the base body 11 serves as a home position 22 where a below-described cap unit 40 is provided.

In the bottom side of the base body 11 of the home position 22, a tube pump not shown in the drawing is provided. The tube pump is a pump in which a roller is pressed from an inner side to an outer side of a flexible tube disposed in a circular arc form to collapse the flexible tube and rotate the roller so that waste liquid or gas in an inner part is moved in a rotating direction. The end part of the flexible tube is connected to a connecting pipe of a cap head 90 not illustrated in the drawing and the other end part is connected to a waste liquid tank not illustrated. When the tube pump is rotated in a prescribed direction, the liquid or the gas stored in the cap head 90 is sucked and transported to the waste liquid tank. The tube pump is driven by a stepping motor (a tube pump motor) not shown in the drawing.

In the end part of cap unit 40 in the side of the row of the gear ring 21, a wiping member 91 is provided. The wiping member 91 is made of, for instance, a member having flexibility (for instance, a rubber plate). Thus, when the recording head 15 is moved to the home position 22 and covered with the cap head 90, the nozzle forming surface 15*a* of the recording head 15 traverses the wiping member, so that ink sticking to the nozzle forming surface 15*a* can be wiped out.

Figure 2:
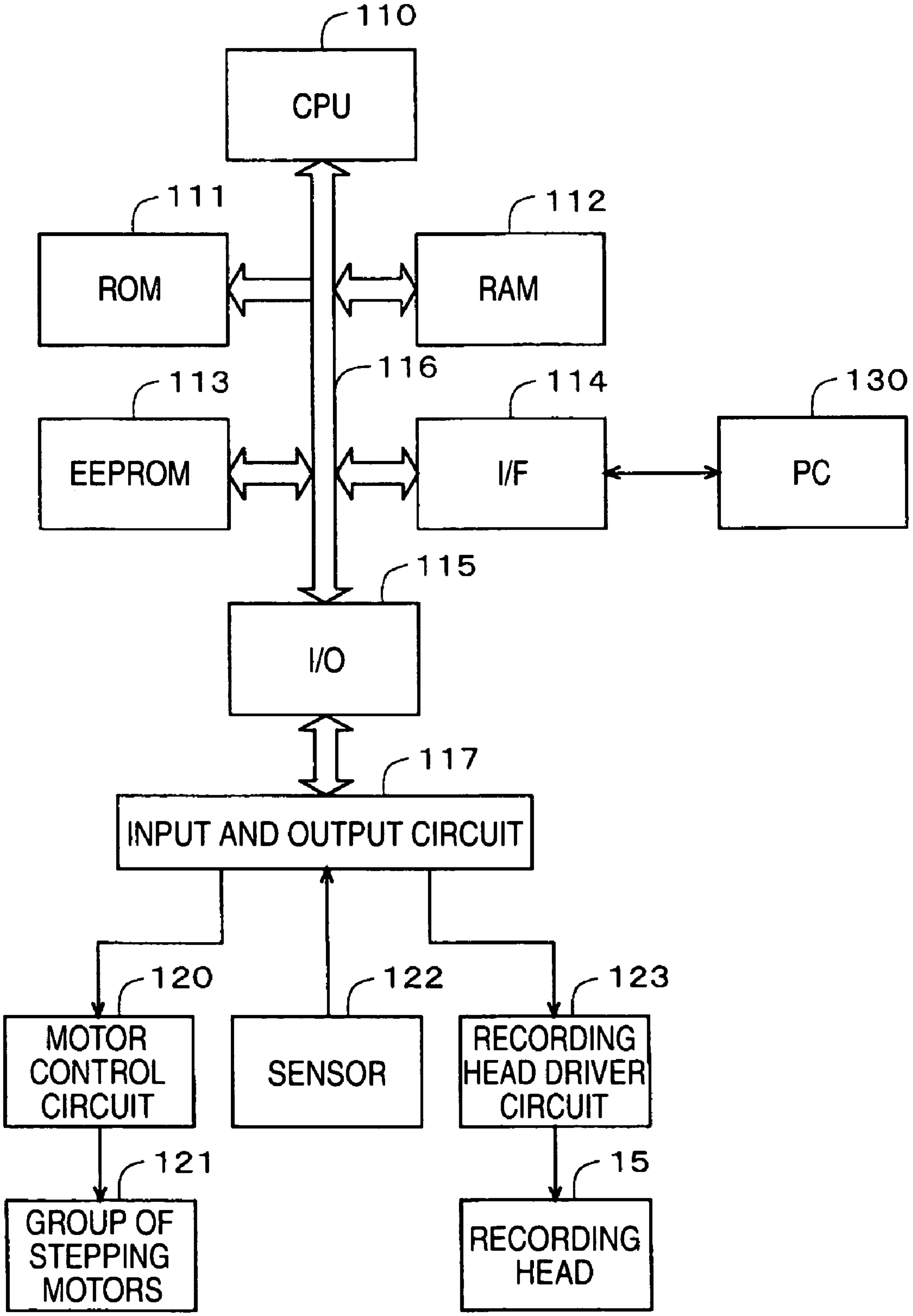
FIG. 2 is a diagram showing a structural example of a control system shown in FIG. 1.

Now, a control system of the printer shown in FIG. 1 will be described. FIG. 2 is a block diagram showing the control system of the printer shown in FIG. 1. As shown in this drawing, the control system of the printer includes a CPU (Central Processing Unit) 110, a ROM (Read Only Memory) 111, a RAM (Random Access Memory) 112, an EEPROM (Electrically Erasable and Programmable ROM) 113, an I/F (Interface) 114, an I/O (Input and Output) 115, a bus 116, an input and output circuit 117, a motor control circuit 120, a group of stepping motors 121, a sensor 122, a recording head driver circuit 123 and the recording head 15. To the I/F 114, a personal computer (PC) 130 as a host computer is connected.

Here, the CPU 110 performs various kinds of calculating processes in accordance with programs stored in the ROM 111 and the EEPROM 113 and controls the respective parts of the device as well as the group of the stepping motors 121.

Figure 5:
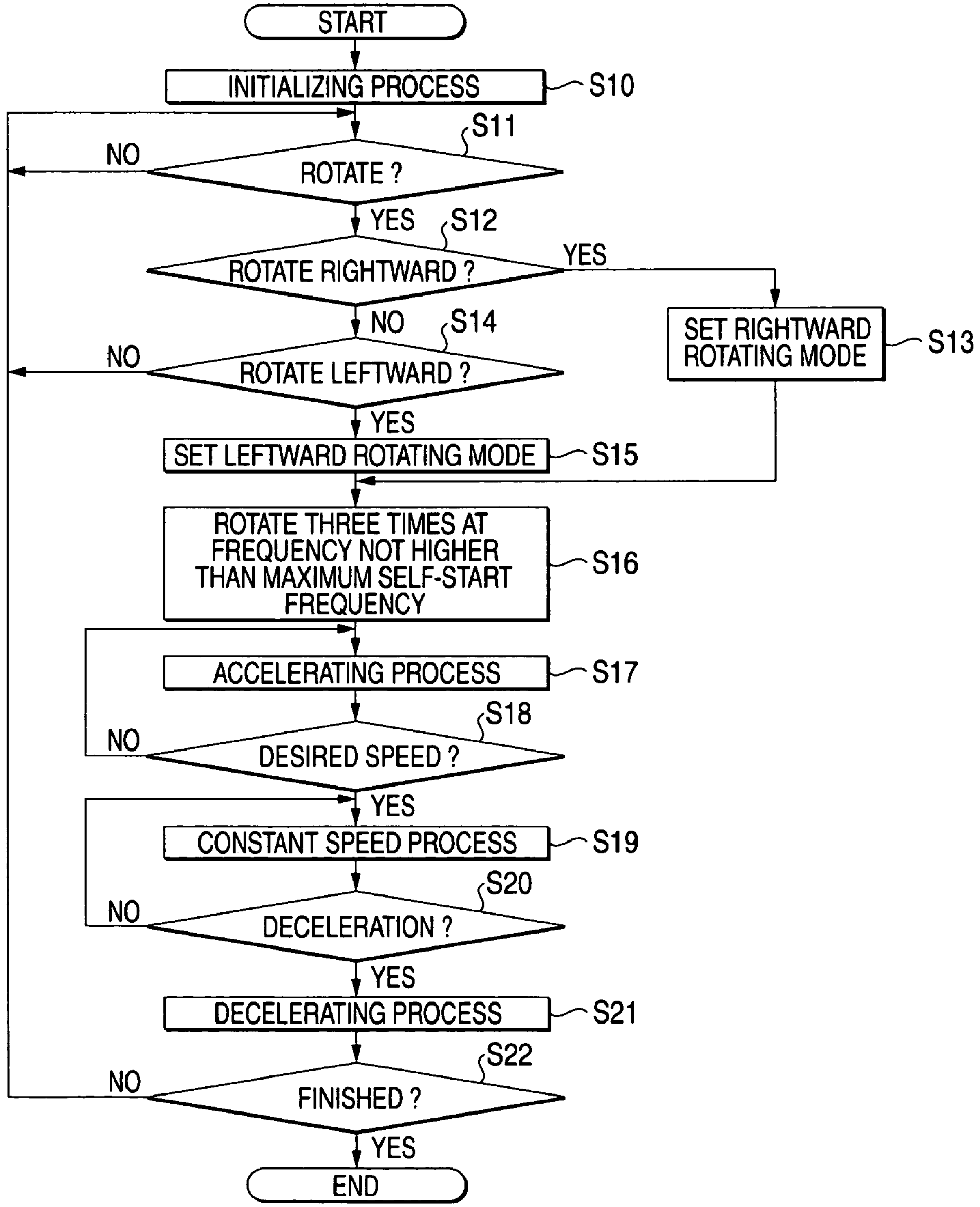
FIG. 5 is one example of a flowchart when a tube pump motor is driven.
Figure 7:
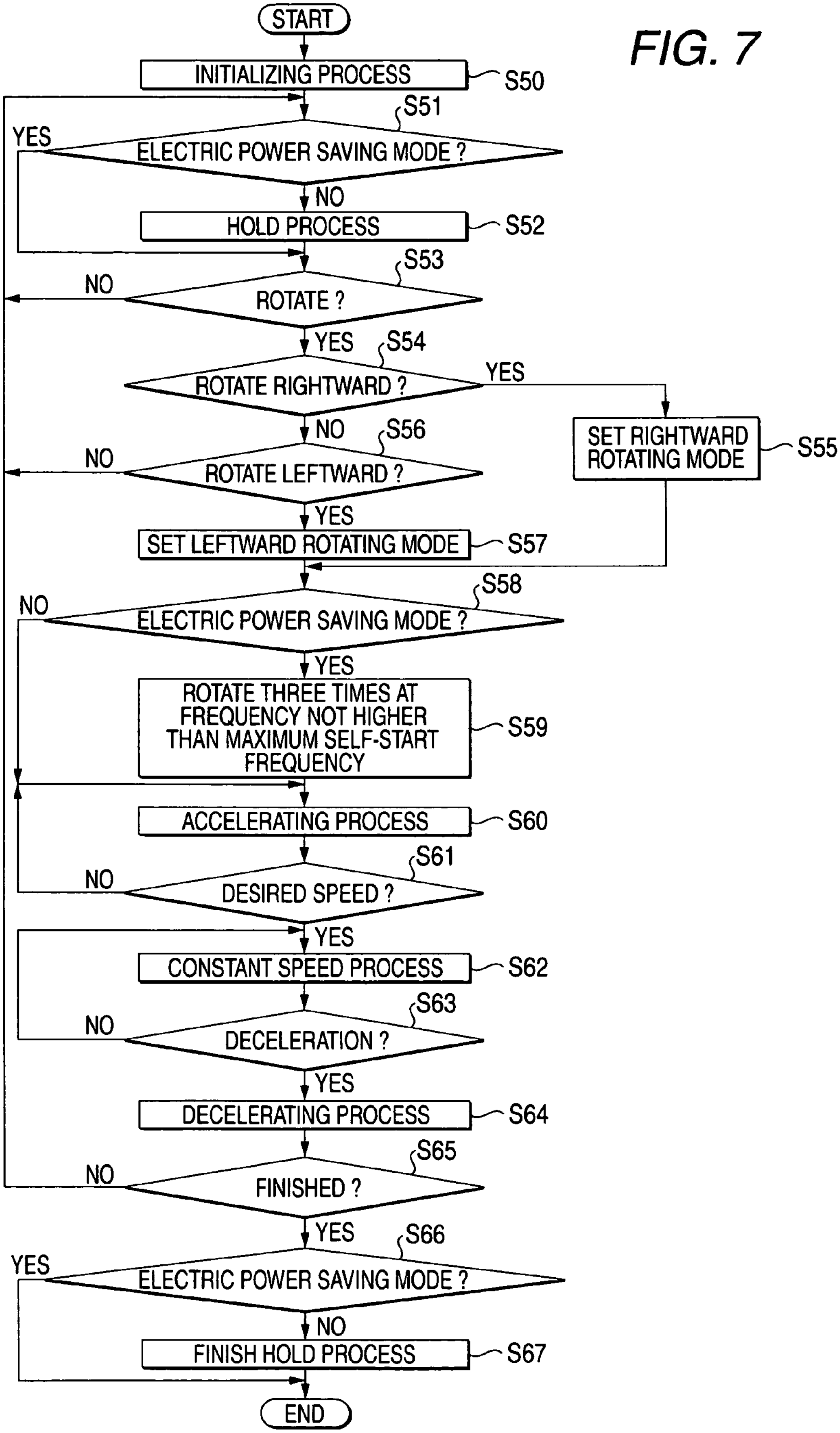
FIG. 7 is one example of a flowchart when a carriage motor is driven.

The ROM 111 is a semiconductor memory for storing various kinds of programs or various kinds of data performed by the CPU 110. In the ROM 111, programs for realizing below-described processes shown in FIGS. 5 and 7 are stored.

The programs are performed so that the stepping motors forming the group of the stepping motors 121 can be respectively controlled.

The RAM 112 is a semiconductor memory for temporarily storing programs or data to be performed by the CPU 110. The programs stored in the ROM 111 are read and performed by the RAM 112, so that the below-described processes shown in FIGS. 5 and 7 are realized and the stepping motors forming the group of the stepping motors 121 are respectively controlled.

The EEPROM is a semiconductor memory in which the prescribed data of a calculated result in the CPU 110 is stored and the data is held even after the power of the printer is turned off.

The I/F 114 is a device for properly converting a representation form of the data when information is transmitted and received between the personal computer 130 and the I/F 114. The I/O 115 is a device for transmitting and receiving information between the input and output circuit 117 and the I/O 115.

The bus 116 is a group of signal lines for mutually connecting the CPU 110, the ROM 111, the RAM 112, the EEPROM 113, the I/F 114 and the I/O 115 to transmit and receive information between them.

The motor control circuit 120 includes a logic circuit and a driving circuit as described below and controls respectively the stepping motors forming the group of the stepping motors 121 in accordance with the control of the CPU 110.

Figure 3:
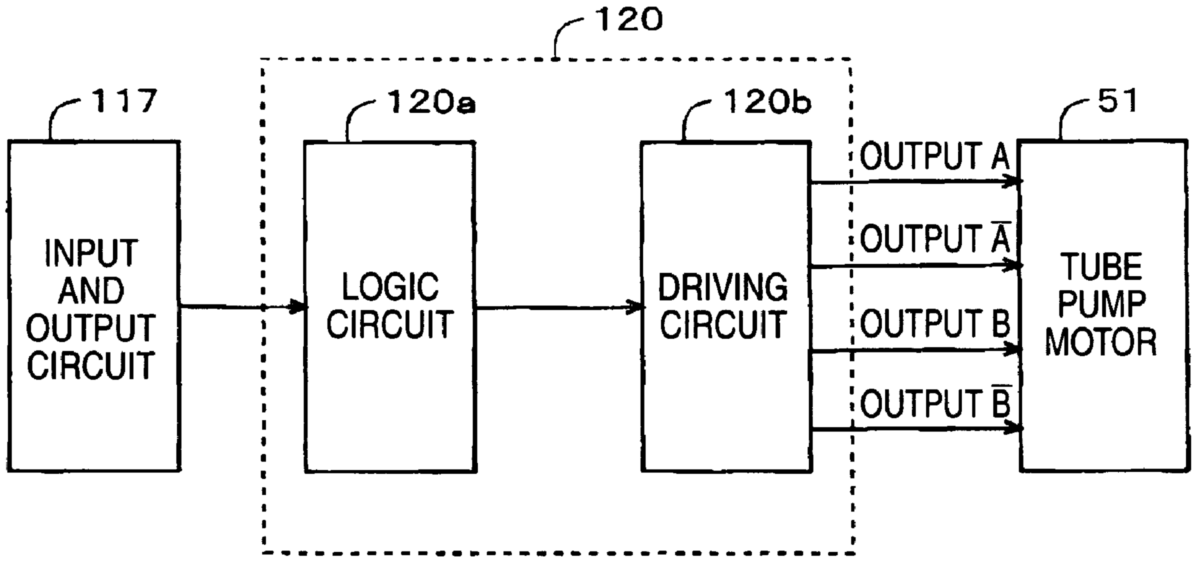
FIG. 3 is a diagram showing a detailed structural example of a motor control circuit shown in FIG. 2.

The group of the stepping motors 121 includes, in this embodiment, the carriage motor 19, the gap adjusting motor 50, the sheet feed motor (not shown in the drawing) and the tube pump motor (see FIG. 3). These motors are driven as required to operate the device for the purpose. Each motor is formed with, for instance, a two-phase stepping motor.

The sensor 122 includes, for instance, a recording sheet sensor, an ink remaining amount sensor, a cumulative operating time sensor or the like to detect various kinds of states of the printer and output them to the I/O 115 through the input and output circuit 117.

The recording head driver circuit 123 is connected to the recording head 15 for carrying out a recording process on the recording sheet 14 to control the recording process to the recording head 15. The recording head 15 discharges various kinds of colors of inks from a plurality of nozzles to print a desired image and a character on the recording sheet 14 in accordance with the control of the recording head driver circuit 123 as described above.

FIG. 3 is a diagram showing a detailed structural example of the motor control circuit 120. In this example shown in the drawing, only a part associated with the tube pump motor 51 of the motor control part 120 is shown. Other stepping motors have the same circuit structures. As shown in FIG. 3, the motor control circuit 120 includes a logic circuit 120*a* and a driving circuit 120*b* as main components.

Here, the logic circuit 120*a* as the control circuit inputs setting data from the CPU 110 through the input and output circuit 117 to set an operating environment and control the driving circuit 120*b* in accordance with driving data supplied from the CPU 110. The driving circuit 120*b* as a switching circuit and a hold current supply circuit switches an electric power supplied from a power source not shown in the drawing under the control of the logic circuit 120*a* and supplies exciting current to the tube pump motor 51 to drive the tube pump motor 51.

FIG. 4 shows control data inputted to the logic circuit 120*a* from the CPU 110 and the output state of the driving circuit 120*b* therefor. The tube pump motor 51 and other stepping motors that form the group of the stepping motors 121 are two-phase stepping motors having two windings of a phase A and a phase B. In FIG. 4, IA1 to IA4 designate a current output ratio Iout of a chopping current outputted to the phase A. Accordingly, the data of IA1 to IA4 is continuously changed so that the current output ratio Iout of the chopping current outputted to the phase A can be continuously raised or lowered.

ENA1 and ENA2 indicate signals for designating that an output is turned on or off. PHA1 designates an output mode for selecting whether the chopping current is outputted to an output terminal A or A- (A bar). In this embodiment, when PHA1 is set to 0, the output mode of the output terminal A shows L (low). When PHA1 is set to 1, the output mode of the output terminal A- shows L (low), and the chopping current is outputted from the output terminal whose output mode shows L. Further, IB1 to IB4 of the phase B designate a current output ratio Iout of a chopping current outputted to the phase B, like IA1 to IA4 of the phase A. Further, PHA2 designates the output mode of the phase B like PHA1 of the phase A. Further, in FIG. 4, * indicates that it may be 0 or 1.

There is data DE1 and DE2 for setting decay as well as the above-described data, though they are not shown in the drawing. DE1 designates a decay setting of the chopping current outputted to the phase A. DE2 designates a decay setting of the chopping current outputted to the phase B. The decay includes a fast decay and a slow decay. Here, the decay indicates a current regenerating method during a chopping off. The slow decay is a method in which a switching transistor is kept turned on to regenerate the current through the switching transistor. The fast decay is a method in which the transistor is kept turned off to regenerate the current through a regenerating diode. The latter is better in responsiveness than the former so that a quick acceleration and deceleration can be realized. However, the latter has a feature that many ripples are generated, and accordingly, the loss of the stepping motor is increased. A mixed decay formed by combining the above-described decays may be selected.

The tube pump motor 51 and other stepping motors are excited by the current values of different current output ratios Iout of the two phases including the phase A and the phase B. Then, the current output ratios Iout of the chopping current outputted to the phase A and the phase B are selected from among state Nos. 0 to 31 in accordance with an excitation system (for instance, 1-2 phase, W1-2 phase, etc.) to be raised or lowered. Thus, the balance of the current between the phase A and the phase B is shifted to rotate the tube pump motor 51. Other stepping motors forming the group of the stepping motors 121 are operated in the same manner as described above.

Now, an operation of the embodiment will be described below.

FIG. 5 is a flowchart for explaining the operation of the tube pump motor 51. The process is realized by performing the program stored in the ROM 111. When the process of the flowchart is started, below-described steps are performed.

Step S10: The CPU 110 performs an initializing process. That is, the CPU 110 sends the setting data to the motor control circuit 120. The motor control circuit 120 receives the setting data from the CPU 110 to perform the initializing process. Specifically, the CPU 110 sets the above-described decay mode. In this embodiment, even under a state that the tube pump motor 51 stops, what is called a hold current for allowing the angle of a rotor of the motor to correspond to a phase of excitation is not supplied. When the hold current is not supplied, the angle of the rotor may deviate from the phase of excitation. However, in this embodiment, even when the rotor deviates from the phase of excitation, the tube pump motor 51 can be assuredly activated. The detail thereof will be described below.

Step S11: The CPU 110 decides whether or not the tube pump motor 51 needs to be rotated. When the tube pump motor needs to be rotated, the CPU 110 advances to step S12. In other case, the CPU 110 repeats the same process. For instance, when a command for cleaning the nozzle of the recording head 15 is transmitted from the personal computer 130, the CPU 110 decides that a rotation needs to be performed to advance to the step S12.

Step S12: The CPU 110 decides whether or not the tube pump motor 51 is rotated rightward. When the tube pump motor is rotated rightward, the CPU 110 advances to step S13. In other case, the CPU 110 advances to step S14.

Step S13: The CPU 110 sets a mode for rotating the tube pump motor 51 rightward. As a result, prescribed data is read and outputted in, for instance, an ascending order from the state Nos. 0 to 31 represented in a sequence diagram shown in FIG. 4.

Step S14: The CPU 110 decides whether or not the tube pump motor 51 is rotated leftward. When the tube pump motor 51 is to be rotated leftward, the CPU 110 advances to step S15. In other case, the CPU 110 decides an error to return to the step S11.

Step S15: The CPU 110 sets a mode for rotating the tube pump motor 51 leftward. As a result, prescribed data is read and outputted in, for instance, a descending order from the state Nos. 0 to 31 represented in the sequence diagram shown in FIG. 4.

Step S16: The CPU 110 sends control data to the motor control circuit 120 to generate a phase change of an excitation corresponding to a state that the tube pump motor 51 is rotated, for instance, three times by a frequency not higher than a maximum self-start frequency. Specifically, the CPU 110 reads data corresponding to a set rotating mode from the sequence diagram shown in FIG. 4 to adjust an output timing so as to have the frequency not higher than the maximum self-start frequency and supply the data to the motor control circuit 120. As a method for adjusting the output timing, for instance, every time the data is outputted, a timer not shown in the drawing may be referred to perform a wait cycle and next data may be outputted after a prescribed time elapses. Then, control signals are continuously supplied corresponding to a state that the tube pump motor 51 rotates, for instance, three times. Here, the maximum self-start frequency means a maximum pulse speed (pps: pulses per second) at which the tube pump motor can be activated under a state that the tube pump motor 51 stops.

In a stage before the process of the step S16 is performed, the tube pump motor 51 is kept in a stopping state. As described above, in this embodiment, since the hold current for holding the rotor at a prescribed angle is not supplied, it is not understood at which angle the tube pump motor stops. However, the phase change is carried out for rotating the tube pump motor 51 three times at the pulse speed not higher than the maximum self-start frequency, so that even when the rotor stops at any angle, the rotor is attracted and forcedly rotated. Accordingly, an excited state corresponds to the angle of the rotor. Theoretically, when the tube pump motor is rotated at least once, the excited state corresponds to the angle of the rotor. However, in this embodiment, to assuredly activate the tube pump motor, the tube pump motor is rotated three times. When the tube pump motor needs to be activated at high speed, the tube pump motor may be rotated once or two times or other number of times than the above-described times (for instance, 1.5 times).

Figure 6:
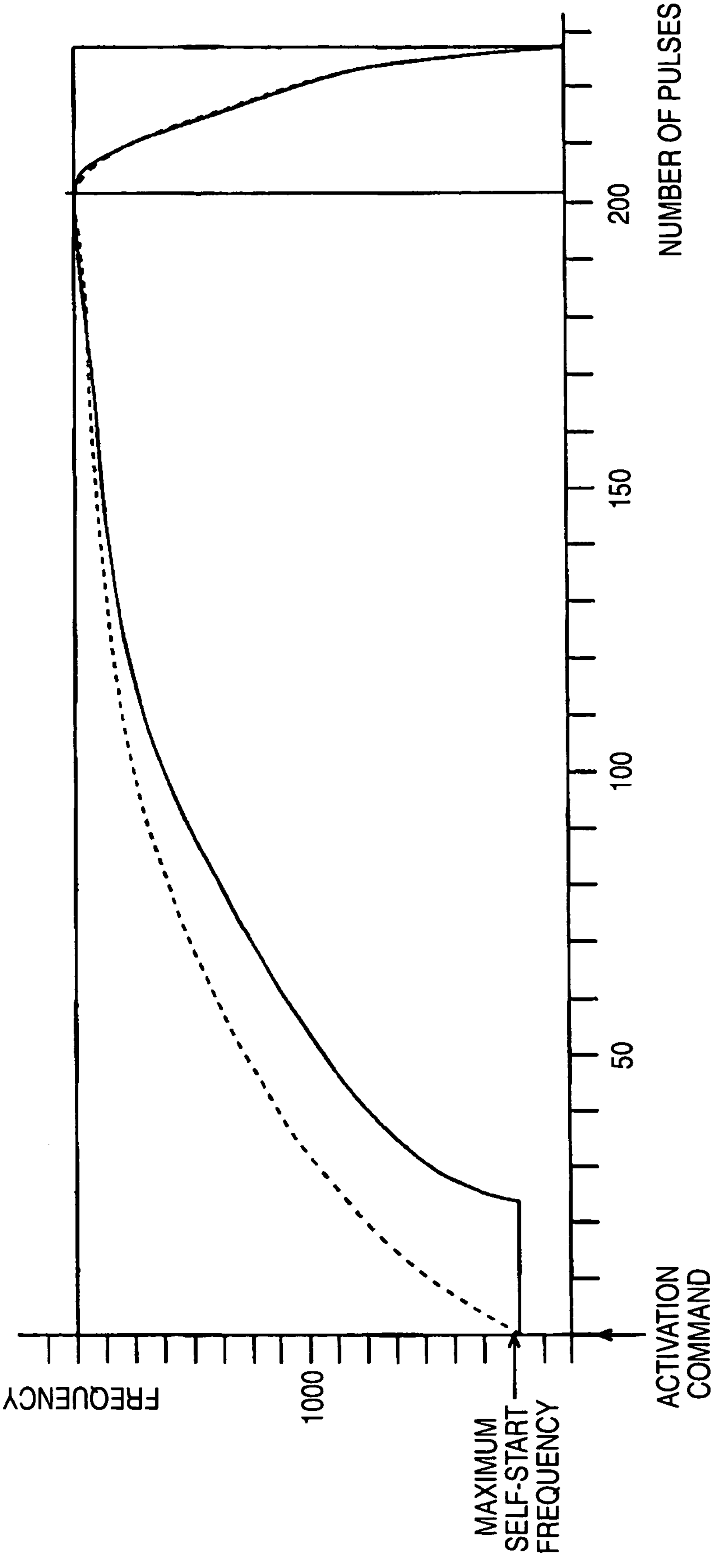
FIG. 6 is a diagram showing a state that a motor of this embodiment and a motor of a usual example are driven.

FIG. 6 is a diagram showing states that the tube pump motor 51 is activated and stopped. In this diagram, an axis of abscissa shows the number of cumulative pulses supplied to the motor control circuit 120. An axis of ordinate shows a pulse speed. Further, a broken line shows states that a usual tube pump motor (when a hold current is used) is activated and stopped. A full line shows states that the tube pump motor 51 in this embodiment is activated and stopped. As shown in FIG. 6, in the case of the usual example, after an activation command is supplied, an accelerating process is immediately carried out. On the other hand, in the case of this embodiment, since the process of the step S16 is performed, after the tube pump motor is driven and rotated three times at constant speed by the frequency not higher than the maximum self-start frequency, an accelerating process is started.

In this embodiment, while the tube pump motor 51 stops, since the hold current is not supplied, the angle of the rotor may possibly deviate from the phase of an excitation. Therefore, when the tube pump motor 51 is activated, the phase of an excitation is rotated three times by the frequency not higher than the maximum self-start frequency. Thus, after the rotor is assuredly attracted (the angle of the rotor is assuredly allowed to correspond to the phase of an excitation), the tube pump motor is activated. As a result, a state can be prevented, resulting from the variation of a load applied to the tube pump motor 51, that the angle of the rotor deviates from the phase of an excitation to cause a step out. On the other hand, in the case of the usual example, while the tube pump motor 51 stops, since the hold current is supplied, the angle of the rotor corresponds to the phase of an excitation. Accordingly, the tube pump motor can be activated without performing a process of step S19. However, even when the tube pump motor 51 is not used, since the hold current needs to be constantly supplied to allow the angle of the rotor to correspond to the phase of an excitation. Accordingly, a consumed electric power is increased more than that of this embodiment. Further, a heat generation is increased more than that of this embodiment. Further, when the load varies, the hold current needs to be increased more to some degree to meet the variation of the load. However, when the hold current is increased, the heat generation of the stepping motor is increased.

Step S17: The CPU 110 starts the accelerating process. That is, the CPU 110 increases the pulse speed of the control data supplied to the motor control circuit 120 to accelerate the tube pump motor 51. As an accelerating method, the pulse speed is increased in accordance with, for instance, an equal acceleration approximate curve, an SIN function approximate curve or an exponential function approximate curve.

Step S18: The CPU 110 decides whether or not the rotating speed of the rotor of the tube pump motor 51 reaches a desired speed. When the rotating speed reaches the desired speed, the CPU 110 advances to step S19. In other case, the CPU 110 returns to the step S17 to repeat the same process.

Step S19: The CPU 110 performs a constant speed process for rotating the tube pump motor 51 at a constant speed. That is, the CPU 110 repeats an operation for supplying a control signal to the motor control circuit 120 so as to have a constant pulse speed.

Step S20: CPU 110 decides whether or not the tube pump motor 51 is decelerated. When the tube pump motor 51 is decelerated, the CPU advances to step S21. In other case, the CPU 110 returns to the step S19 to perform the same process.

Step S21: The CPU 110 starts a decelerating process. That is, the CPU 110 decreases the pulse speed of the control data supplied to the motor control circuit 120 to decelerate the tube pump motor 51. As a decelerating method, the pulse speed is decreased in accordance with, for instance, the above-described equal acceleration approximate curve, the SIN function approximate curve or the exponential function approximate curve, or the pulse speed is decreased at such a speed as not to care about noise generated from the tube pump motor 51. As a result of a deceleration, when the rotor of the tube pump motor 51 stops, the CPU 110 instructs the logic circuit 120*a* to stop the output of the current. Consequently, the hold current is not supplied to the tube pump motor 51.

Step S22: The CPU 110 decides whether or not the processes are finished, that is, whether or not the tube pump motor 51 needs to be rotated again. When the CPU 110 decides that the tube pump motor 51 does not need to be rotated, the CPU 110 completes the processes. In other case, the CPU 110 returns to the step S11 to repeat the same processes. When the processes are completed, the tube pump motor 51 maintains its stopping state, however, the hold current is not supplied.

According to the above-described processes, when the tube pump motor 51 is activated, since the phase of the excitation is rotated three times by the frequency not higher than the self-start frequency, even if the angle of the rotor may deviate from the phase of the excitation, the tube pump motor 51 can be assuredly activated. Accordingly, since the hold current does not need to be supplied, the consumed electric power and the heat generation can be suppressed. Even when the power of the printer 10 is turned on, the tube pump motor 51 maintains a state that an operation is not performed for a long time. Accordingly, in that case, the hold current is not supplied so that the consumed electric power during a stand-by state can be greatly reduced.

Now, the operation of the carriage motor 19 will be described below.

FIG. 7 is a flowchart for explaining the operation of the carriage motor 19 in the embodiment of the present invention. Processes are realized by performing the program stored in the ROM 111. When the processes of the flowchart are started, below-described steps are carried out. In the embodiment of the present invention, a driving mode of the carriage motor 19 includes an electric power saving mode in which the consumed electric power is low, however, an operation is slow and a high speed mode in which the consumed electric power is high, however, an operation is fast. These operation modes may be selected by performing a setting by a printer driver program for driving, for instance, the printer 10 in the personal computer 130 side.

Step S50: The CPU 110 The CPU 110 performs an initializing process. That is, the CPU 110 sends the setting data to the motor control circuit 120. The motor control circuit 120 receives the setting data from the CPU 110 to perform the initializing process. Specifically, the CPU 110 sets the above-described decay mode. Further, when the electric power saving mode is selected, the CPU 110 performs a process for allowing the angle of the carriage motor 19 to correspond to a phase of excitation. Specifically, the carriage motor 19 is rotated three times by the frequency not higher than the maximum self-start frequency to allow the phase of the carriage motor 19 to correspond to the phase of the excitation. Then, when the phases correspond to each other, the CPU 110 refers to an output of an encoder as the sensor 122 to drive the carriage motor 19 and move the carriage 12 to a prescribed position (for instance, the home position). When the high speed mode is selected, since the phases correspond to each other, the CPU 110 immediately moves the carriage 12 to the prescribed position.

Step S51: The CPU 110 decides whether a mode is set to the electric power saving mode or to the high speed mode by reading information from, for instance, the personal computer 130 side. When the mode is set to the electric power saving mode, the CPU 110 advances to step S53. In other case, the CPU 110 advances to step S52.

Step S52: The CPU 110 performs a hold process for holding the angle of a rotor of the carriage motor 19. Specifically, the CPU 110 sends a prescribed control signal to the logic circuit 120*a* to output an exciting current corresponding to the angle (phase) of the rotor of the carriage motor 19 at that time from the driving circuit 120*b*. Thus, the hold current for holding the angle of the rotor of the carriage motor 19 is supplied.

Step S53: The CPU 110 decides whether or not the carriage motor 19 needs to be rotated. When the carriage motor 19 needs to be rotated, the CPU 110 advances to step S54. In other case, the CPU 110 returns to the step S51 to repeat the same process. For instance, when a command for starting a printing operation is transmitted from the personal computer 130, the CPU 110 decides that the carriage motor 19 needs to be rotated to advance to the step S54.

Step S54: The CPU 110 decides whether or not the carriage motor 19 is rotated rightward. When the carriage motor is rotated rightward, the CPU 110 advances to step S55. In other case, the CPU 110 advances to step S56.

Step S55: The CPU 110 sets a mode for rotating the carriage motor 19 rightward. As a result, prescribed data is read and outputted in, for instance, an ascending order from the state Nos. 0 to 31 represented in the sequence diagram shown in FIG. 4.

Step S56: The CPU 110 decides whether or not the carriage motor 19 is rotated leftward. When the carriage motor 19 is to be rotated leftward, the CPU 110 advances to step S57. In other case, the CPU 110 decides an error to return to the step S51.

Step S57: The CPU 110 sets a mode for rotating the carriage motor 19 leftward. As a result, prescribed data is read and outputted in, for instance, a descending order from the state Nos. 0 to 31 represented in the sequence diagram shown in FIG. 4.

Step S58: The CPU 110 decides whether a mode is set to the electric power saving mode or to the high speed mode by reading information from, for instance, the personal computer 130 side. When the mode is set to the electric power saving mode, the CPU 110 advances to step S59. In other case, the CPU 110 advances to step S60.

Step S59: The CPU 110 sends control data to the motor control circuit 120 to generate a phase change of an excitation corresponding to a state that the carriage motor 19 is rotated, for instance, three times by the frequency not higher than the maximum self-start frequency. Specifically, the CPU 110 reads data corresponding to the set mode from the sequence diagram shown in FIG. 4 to adjust an output timing so as to have the frequency not higher than the maximum self-start frequency and supply the data to the motor control circuit 120. As a method for adjusting the output timing, for instance, every time the data is outputted, a timer not shown in the drawing may be referred to perform a wait cycle and next data may be outputted after a prescribed time elapses, as described above. Then, control signals are continuously supplied corresponding to a state that the carriage motor 19 rotates, for instance, three times.

Before the process of the step S59 is performed, the carriage motor 19 is kept in a stopping state. When the mode is set to the electric power saving mode, since the hold current for holding the rotor at a prescribed angle is not supplied, it is not understood at which angle the carriage motor stops. However, the excitation is carried out for rotating the carriage motor 19 three times at the pulse speed not higher than the maximum self-start frequency, so that even when the rotor stops at any angle, the rotor is attracted and forcedly rotated. Accordingly, an excited state corresponds to the angle of the rotor. Theoretically, when the carriage motor is rotated at least once, the excited state corresponds to the angle of the rotor. However, in this embodiment, to assuredly activate the carriage motor, the carriage motor is rotated three times. When the carriage motor needs to be activated at high speed, the carriage motor may be rotated once or two times or other number of times than the above-described times (for instance, 1.5 times).

When the mode is set to the high speed mode, the carriage motor 10 is activated along a curve as shown by the broken line in FIG. 6. Further, when the mode is set to the electric power saving mode, the carriage motor 19 is activated along a curve as shown by the full line in FIG. 6. As shown in FIG. 6, when the high speed mode is set, after an activation command is supplied, an accelerating process is immediately carried out. On the other hand, when the electric power saving mode is set, since the process of the step S59 is performed, after the carriage motor is driven and rotated three times at constant speed by the frequency not higher than the maximum self-start frequency, an accelerating process is started.

When the mode is set to the electric power saving mode, while the carriage motor 19 stops, since the hold current is not supplied as described above, the angle of the rotor may possibly deviate from the phase of an excitation. Therefore, when the carriage motor 19 is activated, the phase of an excitation is rotated three times by the frequency not higher than the maximum self-start frequency. Thus, after the rotor is assuredly attracted (the angle of the rotor is assuredly allowed to correspond to the phase of an excitation), the carriage motor is activated. As a result, a state can be prevented, resulting from the variation of a load applied to the carriage motor 19, that the angle of the rotor deviates from the phase of an excitation to cause a step out. On the other hand, when the mode is set to the high speed mode, during the stop of the carriage motor 19, since the hold current is supplied, the angle of the rotor corresponds to the phase of an excitation. Accordingly, the carriage motor 19 can be activated without performing the process of the step S59. Accordingly, the carriage motor 19 can be accelerated at high speed to a prescribed speed.

Step S60: The CPU 110 starts an accelerating process. That is, the CPU 110 increases the pulse speed of control data supplied to the motor control circuit 120 to accelerate the carriage motor 19. As an accelerating method, the pulse speed is increased in accordance with, for instance, an equal acceleration approximate curve, an SIN function approximate curve or an exponential function approximate curve.

Step S61: The CPU 110 decides whether or not the rotating speed of the rotor of the carriage motor 19 reaches a desired speed. When the rotating speed reaches the desired speed, the CPU 110 advances to step S62. In other case, the CPU 110 returns to the step S60 to repeat the same process.

Step S62: The CPU 110 performs a constant speed process for rotating the carriage motor 19 at a constant speed. That is, the CPU 110 repeats an operation for supplying a control signal to the motor control circuit 120 so as to have a constant pulse speed.

Step S20: CPU 110 decides whether or not the carriage motor 19 is decelerated. When the carriage pump motor 19 is decelerated, the CPU advances to step S64. In other case, the CPU 110 returns to the step S62 to perform the same process.

Step S64: The CPU 110 starts a decelerating process. That is, the CPU 110 decreases the pulse speed of the control data supplied to the motor control circuit 120 to decelerate the carriage motor 19. As a decelerating method, the pulse speed is decreased in accordance with, for instance, the above-described equal acceleration approximate curve, the SIN function approximate curve or the exponential function approximate curve. At this time, when the mode is set to the high speed mode, if the deceleration is too fast, a step out may be possibly generated. Thus, a decelerating speed is set by considering the step out.

Step S65: The CPU 110 decides whether or not the processes are finished, that is, whether or not the carriage motor 19 needs to be rotated again. When the CPU 110 decides that the carriage motor 19 does not need to be rotated, the CPU 110 advances to step S66. In other case, the CPU 110 returns to the step S51 to repeat the same processes.

Step S66: The CPU decides whether or not the mode is set to the electric power saving mode by reading information from, for instance, the personal computer 130 side. When the mode is set to the electric power saving mode, the CPU completes the processes. In other case, the CPU advances to step S67.

Step S67: The CPU 110 finishes the hold process. Specifically, the CPU sends a prescribed control signal to the logic circuit 120*a* to supply the hold current for fixing the angle of the rotor of the carriage motor 19 and thus finish the hold process. As a result, when the mode is set to the electric power saving mode, for instance, after a printing operation is completed, the hold current is not supplied to the carriage motor 19, so that the consumed electric power can be suppressed. Further, since the electric power is not supplied to the carriage motor, the heat generation of the motor control circuit 120 and the carriage motor 19 can be suppressed.

According to the above-described processes, since the hold current is supplied to the carriage motor 19 as required, for instance, when a printing process is not performed, the hold current is not supplied to the carriage motor. Thus, the consumed electric power and the heat generation can be restricted.

Further, when the hold current is not supplied, the angle of the rotor may possibly deviate from the phase of the excitation, however, after the phase of the excitation is rotated prescribed times by the frequency not higher than the maximum self-start frequency in accordance with the process shown in the step S59, the accelerating process is carried out. Thus, the carriage motor 19 can be assuredly activated.

Further, according to the above-described processes, the electric power saving mode in which the consumed electric power is restricted and the high speed mode in which an operation can be performed at high speed can be selected depending on the purpose of a user.

In the above-described processes, when the mode is set to the high speed mode, even after the processes shown in FIG. 7 are finished (even when the carriage motor 19 is stopped for a long time), the hold current is continuously supplied. However, for instance, when the carriage motor is stopped for a long time, even if the high speed mode is set, the hold current may not be supplied. In that case, in the step S66, the CPU may advance to the step S67 in all cases. When the carriage motor is activated, the deviation between the angle of the motor and the phase of the excitation may be corrected by the initializing process of the step S50.

In the above-described embodiment, the processes of the steps S52, S59 and S67 are carried out depending on whether the mode is set to the electric power saving mode or the high speed mode. In other case, for instance, when the sheet feed motor and the tube pump motor are commonly used, if the stepping motor operates as the sheet feed motor, the hold current may be supplied. When the stepping motor operates as the tube pump motor, the hold current may not be supplied.

That is, in the case of the sheet feed motor, when a sheet feeding operation is performed, the recording sheet 14 is moved by a prescribed distance in the sub-scanning direction (the direction Y in FIG. 1), then, the recording sheet 14 is held at this position, and the carriage 12 is scanned in the main scanning direction (the direction X in FIG. 1) to print one line. When the printing operation is finished, the recording sheet is moved by a prescribed distance to print a next line. Therefore, when the recording sheet 14 shifts during the printing operation, unevenness in printing is generated. To prevent the unevenness in printing, the hold current needs to be supplied to the sheet feed motor not to rotate the rotor. On the other hand, in the case of the tube pump motor, since the rotor does not need to be held at a prescribed angle, the hold current does not need to be supplied. Therefore, when these motors are commonly used, the hold current may not be supplied depending on whether the motor is used as the tube pump motor or as the sheet feed motor. To realize such a process, in the steps S51, S58, and S66, whether or not the stepping motor is used as the tube pump motor may be decided.

The above-described embodiment shows one example and various kinds of modified embodiments may be made in addition thereto within a scope without departing the gist of the present invention. For instance, in the above-described embodiment, when the tube pump motor 51 or the carriage motor 19 is activated, the phase of the excitation is rotated three times by the frequency not higher than the maximum self-start frequency. However, for instance, the phase of the excitation may be rotated once or twice or four times or more. Further, when the tube pump motor or the carriage motor can be certainly activated, the number of times of rotations may be set to once or smaller (for instance, ½ times).

In the above-described embodiment, the phase of the excitation is rotated by the frequency not higher than the maximum self-start frequency in the same direction as the direction for activating the tube pump motor or the carriage motor. However, the phase of the excitation may be rotated ¼ times as much as one rotation in an opposite direction to the direction for activating the motor, and then, may be rotated in the direction for activating the motor. In such an embodiment, even when the rotor deviates in any direction, the motor can be assuredly activated in a little time.

Further, in the above-described embodiment, the number of times of rotations is fixed (for instance, three times), however, the number of times of rotations may be changed depending on, for instance, the condition of the device. For instance, in the case of the tube pump motor 51, since the viscosity of ink changes depending on temperature, an environmental temperature is detected by a temperature sensor or the like. When the temperature is high, the viscosity is low, so that the number of times of rotation may be automatically decreased. When the temperature is low, the viscosity is high, so that the number of times of rotation may be automatically increased. Further, as an elapsing time after the printer is produced (or after the printer begins to be used) grows longer, the number of times of rotations may be increased more by considering the deterioration of the respective parts of the printer due to an aged deterioration.

Figure 8:
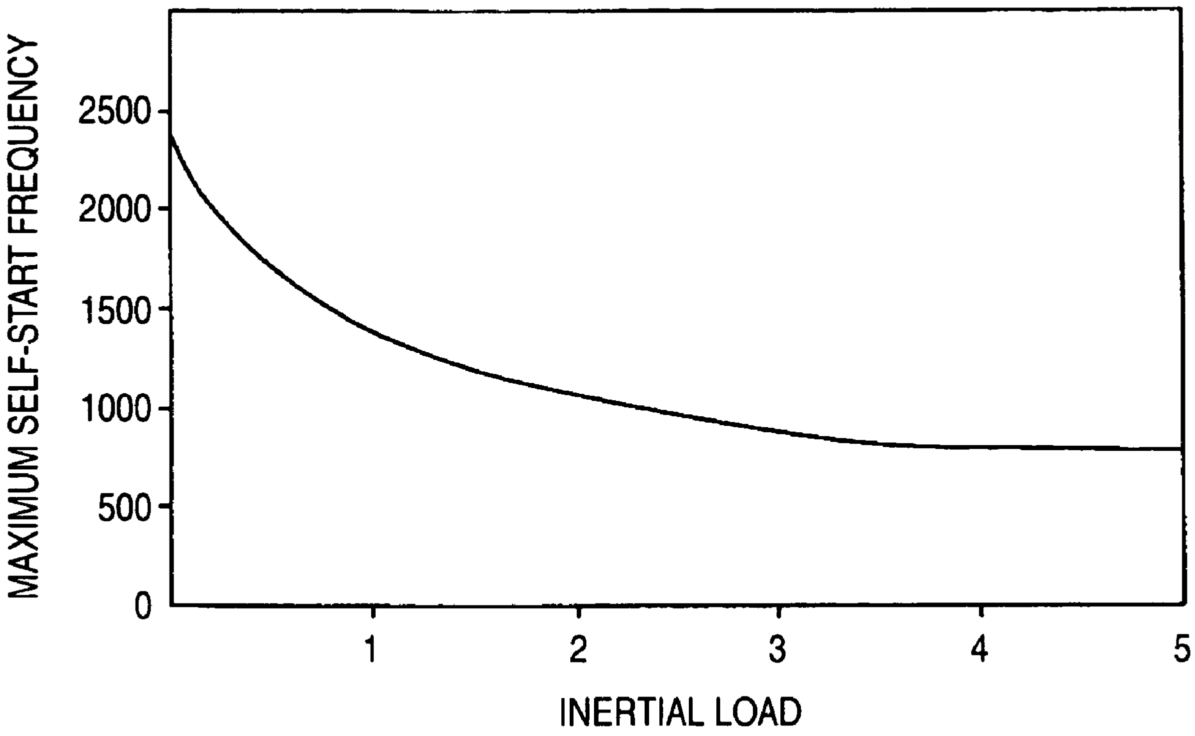
FIG. 8 is a diagram showing a relation between an inertial load and a maximum self-start frequency.

Further, in the above-described embodiment, the maximum self-start frequency is fixed, however, it has been actually known that the maximum self-start frequency changes due to an inertial load. FIG. 8 is a diagram showing a relation between the inertial load and the maximum self-start frequency. As shown in FIG. 8, when the inertial load increases, the maximum self-start frequency accordingly decreases. Accordingly, when the inertial load changes, for instance, a maximum inertial load may be actually measured to obtain the maximum self-start frequency in accordance with the measured result and the maximum self-start frequency may be set to a frequency not higher than the obtained maximum self-start frequency.

When the maximum self-start frequency cannot be actually measured, the maximum self-start frequency can be approximately obtained by, for instance, a below-described method. That is, assuming that the maximum self-start frequency of a single stepping motor designates $f_s$, the maximum self-start frequency when the inertial load exists designates f, a moment of inertia of the rotor designates Jo and a moment of inertia of the load designates $J_L$, the following formula is established between them.

$$f=f_s/(1+J_L/Jo)^{1/2} \quad \text{(formula 1)}$$

Accordingly, when $f_s$, $J_L$ and Jo are obtained, since the maximum self-start frequency f can be approximately obtained by using the above-described formula. Thus, the maximum self-start frequency may be set by using the obtained value.

Further, when the maximum self-start frequency changes depending on the state of the stepping motor, the maximum self-start frequency may be changed respectively in accordance with the states. For instance, when the maximum self-start frequency of the rightward rotation of the stepping motor is different from that of the leftward rotation of the stepping motor, the maximum self-start frequency may be changed respectively in accordance with the directions. Further, in the case of the carriage motor 19, when the maximum self-start frequency changes depending on the stop position of the carriage 12, the stopping position may be stored immediately before the maximum self-start frequency changes to determine the pulse speed in accordance with the maximum self-start frequency at the position.

In the above-described embodiment, the two-phase stepping motor is used, however, a one-phase stepping motor or a three or more-phase stepping motor may be used.

Further, in the above-described embodiment, when the stepping motor is rotated (activated) by the frequency not higher than the maximum-self start frequency, the same current as that during the acceleration is supplied. However, only at the time of activation, the exciting current may be increased. In such an embodiment, the stepping motor can be assuredly activated.

Further, in the above-described embodiment, the stepping motor can be rotated in both directions, namely, rightward and leftward. However, it is to be understood that the present invention may be applied to a stepping motor rotating only in one direction.

Further, in the above-described embodiment, the CPU 110 generates the control signal and the logic circuit 120*a* receives the control signal to drive the driving circuit 120*b*. However, the roles of them are not limited to such a case. For instance, the logic circuit 120*a* may perform a function of the CPU 110 in place thereof.

Further, the sequence diagram shown in FIG. 4 represents an example and the present invention is not limited thereto.

Further, in the above-described embodiment, as shown in FIG. 6, when the stepping motor is stopped, the decelerating process is performed. However, in this embodiment, when the stepping motor is activated by the frequency not higher than the maximum self-start frequency, if the stepping motor stops, the stepping motor can be assuredly activated even under a state that the angle of the rotor does not correspond to the phase of the excitation. Therefore, the rotation can be suddenly stopped without performing the decelerating process. For instance, the excitation can be stopped or the excitation can be carried out in an opposite direction to the rotating direction of the rotor. According to such an embodiment, the rotor can be abruptly stopped.

The above-described processing function can be realized by the computer. In this case, a program is provided in which the processing contents of functions to be provided by the stepping motor controller are described. The program is performed by the computer so that the processing functions are realized on the computer. The program in which the processing contents are described can be recorded on a recording medium that can be read by the computer. As the recording medium that can be read by the computer, exemplified are a magnetic recording device, an optical disk, a photo-electromagnetic recording medium, a semiconductor memory, etc. The magnetic recording device includes a hard disk device (HDD), a flexible disk (FD), a magnetic tape, etc. As the optical disk, are exemplified a DVD (Digital Versatile Disk), a DVD-RAM, a CD-ROM (Compact Disk ROM), a CD-R (Recordable)/RW (Rewritable), etc. As the photo-electromagnetic recording medium, an MO (Magneto-Optical disk) or the like is included.

To circulate the program, a portable recording medium such as the DVD, the CD-ROM, etc. on which the program is recorded is sold. Further, the program may be stored in a storage device of a server computer and the program may be transferred to other computer from the server computer through a network.

The computer for performing the program stores the program recorded on the portable recording medium or transferred from the server computer in its own storage device. Then, the computer reads the program of its own storage device and performs a process in accordance with the program. The computer may directly read the program from the portable recording medium and perform the process in accordance with the program. Further, every time a program is transferred from the server computer, the computer can perform a process one by one in accordance with the received program.

What is claimed is:

1. A stepping motor control method for a stepping motor which is controlled by a first mode and a second mode that is different from the first mode, the method comprising:

deciding whether a mode of the stepping motor is set to the first mode or the second mode;

in a case that the mode of the stepping motor is set to the first mode, supplying hold current for holding a rotor of the stepping motor at a prescribed angle to the stepping motor as required while the stepping motor stops, and then performing an accelerating process, and in a case that the mode of the stepping motor is set to the second mode, performing a phase change at a frequency lower than a maximum self-start frequency when the stepping motor is rotated from a stopping state, under a state that the hold current is not supplied to the stepping motor, and then performing an accelerating process.

2. The stepping motor control method according to claim 1, wherein in the second mode, the phase change is performed at least once at the frequency lower than a maximum self-start frequency when the stepping motor is rotated from the stopping state.

3. The stepping motor control method according to claim 2, wherein the number of times of the phase change is set depending on a situation.

4. The stepping motor control method according to claim 1, wherein in the second mode, the frequency of the phase change is set in accordance with the maximum self-start frequency which changes depending on a load.

5. A stepping motor control method for a stepping motor controller which is controlled by a first mode and a second mode that is different from the first mode, the controller including: a control circuit, controlling an exciting sequence of a stepping motor; a switching circuit, switching electric power supplied to the stepping motor in accordance with a command from the control circuit; and a hold current supply circuit, supplying hold current for holding a rotor, the method comprising:

deciding whether a mode of the stepping motor is set to the first mode or the second mode;

in a case that the mode of the stepping motor is set to the first mode, supplying hold current for holding the rotor of the stepping motor at a prescribed angle to the stepping motor as required while the stepping motor stops in a case that the mode of the stepping motor is set to the second mode, in which the hold current is not supplied to the stepping motor, performing a phase change at a frequency lower than a maximum self-start frequency when the stepping motor is rotated from a stopping state, under a state in which the hold current is not supplied to the stepping motor by the hold current supply circuit, and then performing an accelerating process.

6. A stepping motor controller comprising:

a control circuit, controlling an exciting sequence of a stepping motor in a first mode and a second mode that is different from the first mode;

a deciding unit, deciding whether a mode of the stepping motor is set to the first mode or the second mode;

a switching circuit, switching electric power supplied to the stepping motor in accordance with a command from the control circuit; and a hold current supply circuit, supplying hold current for holding a rotor of the stepping motor at a prescribed angle to the stepping motor as required while the stepping motor stops, wherein when the mode of the stepping motor is set to the first mode, the hold current is supplied to the stepping motor, and then an accelerating process is performed, and when the mode of the stepping motor is set to the second mode, the control circuit performs a phase change at a frequency lower than a maximum self-start frequency while the hold current is not supplied to the stepping motor, and then, an accelerating process is performed.

7. The stepping motor controller according to claim 6, wherein when the stepping motor maintains the stopping state for a prescribed time or more, the hold current supply circuit does not supply the hold current to the stepping motor.

8. The stepping motor controller according to claim 6, wherein in the second mode, when the stepping motor is rotated from a stopping state, the control circuit performs the phase change for rotating the stepping motor at least once at the frequency lower than the maximum self-start frequency.

9. The stepping motor controller according to claim 8, wherein the control circuit sets the number of times of the phase change performed at the frequency lower than the maximum self-start frequency depending on a situation.

10. The stepping motor controller according to claim 6, wherein in the second mode, the control circuit sets the frequency of the phase change in accordance with the maximum self-start frequency which changes depending on a load.

* * * * *